(12) United States Patent
Walme et al.

(10) Patent No.: US 9,559,562 B2
(45) Date of Patent: *Jan. 31, 2017

(54) VOLTAGE REGULATOR DEVICE FOR ROTARY ELECTRIC MACHINE, BEARING FOR ROTARY ELECTRIC MACHINE EQUIPPED WITH SUCH DEVICE AND MACHINE COMPRISING SUCH BEARING

(75) Inventors: Benoit Walme, Feucherolles (FR); Christophe Dugue, Palaiseau (FR); Brice Lecole, Paris (FR); Pierre Tisserand, Limeil Brevannes (FR)

(73) Assignee: Valeo Equipements Electriques Moteur (FR)

( * ) Notice: Subject to any disclaimer, the term of this patent is extended or adjusted under 35 U.S.C. 154(b) by 685 days.

This patent is subject to a terminal disclaimer.

(21) Appl. No.: 13/996,224

(22) PCT Filed: Dec. 19, 2011

(86) PCT No.: PCT/FR2011/053042
§ 371 (c)(1),
(2), (4) Date: Sep. 4, 2013

(87) PCT Pub. No.: WO2012/085421
PCT Pub. Date: Jun. 28, 2012

(65) Prior Publication Data
US 2013/0334915 A1   Dec. 19, 2013

(30) Foreign Application Priority Data
Dec. 20, 2010   (FR) ..................................... 10 60779

(51) Int. Cl.
*H02K 9/28*   (2006.01)
*H02K 11/04*   (2016.01)
(Continued)

(52) U.S. Cl.
CPC ........... *H02K 5/18* (2013.01); *H02K 5/20* (2013.01); *H02K 9/06* (2013.01); *H02K 9/28* (2013.01); *H02K 11/048* (2013.01); *H02K 11/33* (2016.01)

(58) Field of Classification Search
CPC .............. H02K 5/18; H02K 5/20; H02K 9/06; H02K 9/28
(Continued)

(56) References Cited

U.S. PATENT DOCUMENTS

| 4,541,004 A | * | 9/1985 | Moore ................ H01L 23/3677 257/706 |
| 7,019,424 B2 | | 3/2006 | Aeschlimann et al. |

(Continued)

FOREIGN PATENT DOCUMENTS

| EP | 0300063 | 1/1989 |
| EP | 0454039 | 10/1991 |

(Continued)

*Primary Examiner* — Terrance Kenerly
(74) *Attorney, Agent, or Firm* — Berenato & White, LLC

(57) ABSTRACT

A voltage regulator device for a rotary electrical machine, notably an alternator and/or alternator-starter of a motor vehicle. The regulator device (14) comprises one or more electronic components (28) able to contribute to controlling the electric machine, a heat sink (30) having parallel heat-dissipating vanes (32). The heat sink is in a heat-exchange relationship with the component or components, and a support (34) on which the heat sink is positioned. The support is able to be mounted on the electric machine in such a way that the vanes of the heat sink can orient an air flow towards a region of depression provided between the support and the machine. A bearing of an electric machine is equipped with such a device and to an electric machine equipped with such a bearing.

24 Claims, 7 Drawing Sheets

(51) Int. Cl.
*H02K 11/00* (2016.01)
*H02K 5/18* (2006.01)
*H02K 5/20* (2006.01)
*H02K 9/06* (2006.01)

(58) Field of Classification Search
USPC .......................................................... 310/64
See application file for complete search history.

(56) References Cited

U.S. PATENT DOCUMENTS

| | | | |
|---|---|---|---|
| 2002/0053841 A1* | 5/2002 | Asao | H02K 5/141 |
| | | | 310/68 B |
| 2002/0175589 A1 | 11/2002 | Takizawa et al. | |
| 2003/0111929 A1* | 6/2003 | Hong | H02K 5/148 |
| | | | 310/239 |
| 2007/0035188 A1 | 2/2007 | Miller et al. | |

FOREIGN PATENT DOCUMENTS

| | | |
|---|---|---|
| EP | 0731550 | 9/1996 |
| FR | 2649797 | 1/1991 |
| FR | 2710200 | 3/1995 |
| FR | 2744575 | 8/1997 |
| FR | 2745444 | 8/1997 |
| FR | 2754650 | 4/1998 |
| FR | 2857517 | 1/2005 |
| WO | WO02054566 | 7/2002 |
| WO | WO02093717 | 11/2002 |

\* cited by examiner

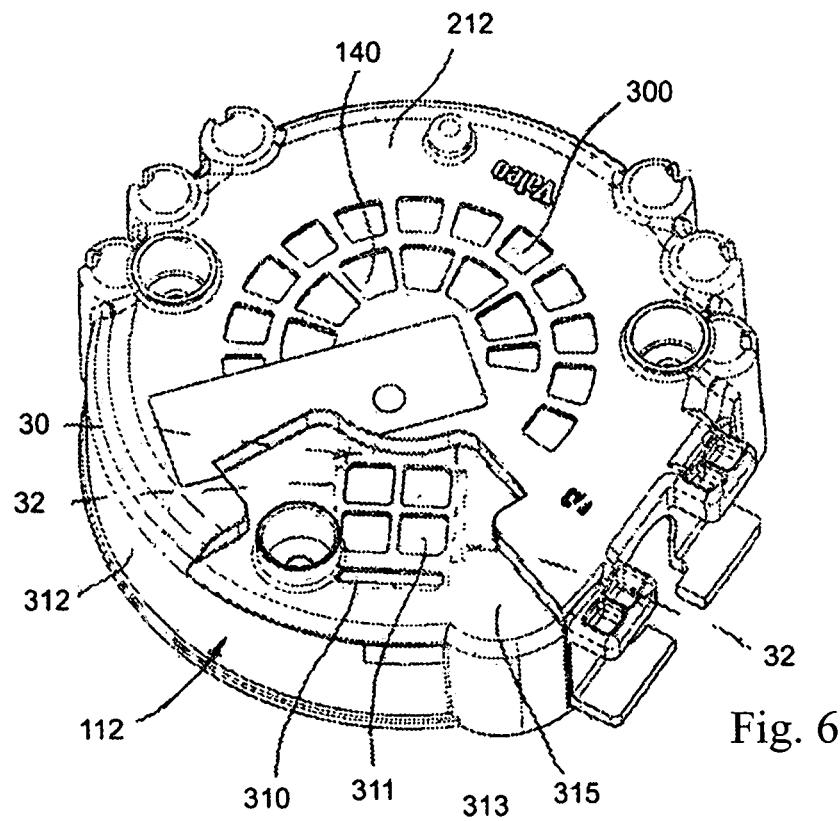
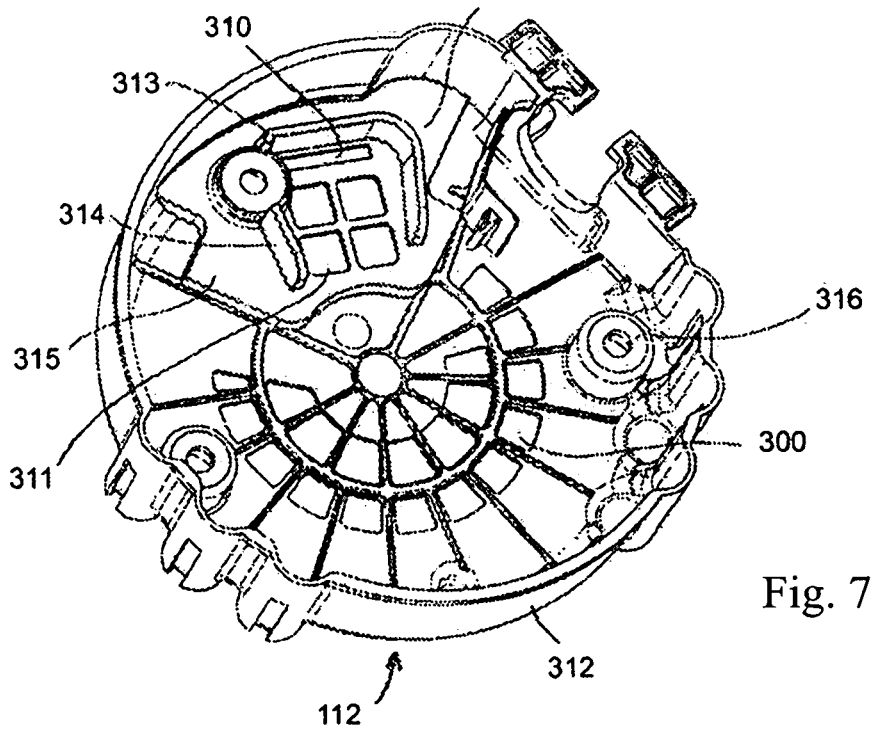

VOLTAGE REGULATOR DEVICE FOR ROTARY ELECTRIC MACHINE, BEARING FOR ROTARY ELECTRIC MACHINE EQUIPPED WITH SUCH DEVICE AND MACHINE COMPRISING SUCH BEARING

CROSS-REFERENCE TO RELATED APPLICATIONS AND CLAIM TO PRIRITY

This application is a national stage application of International Application No. PCT/FR2011/053042 filed Dec. 19, 2001, which claims priority to French Patent Application No. 10/60779 filed Dec. 20, 2010, of which the disclosures are incorporated herein by reference and to which priority is claimed.

FIELD OF THE INVENTION

The present invention relates to a voltage regulator device for an especially polyphase rotary electric machine, such as an alternator and/or an alternator-starter of a motor vehicle.

The present invention also relates to a bearing of such a rotary electric machine equipped with such a voltage regulator device and with a current rectifying device.

The present invention finally relates to such a rotary electric machine, equipped with such a bearing.

PRIOR ART

Alternators of motor vehicles comprising a wound stator enclosing a rotor and at least one field winding of the rotor are known today. They function as generator of electric current to electrically feed the on-board power supply of a motor vehicle and to recharge its battery. For this purpose the rotor of the alternator is rotated by the thermal engine of the vehicle via a movement transmission device and its field winding is fed by an electric current, known as excitation current. The rotor, magnetized in this way, generates an electromotive force in such a way that an AC current is induced in the winding of the stator of the machine, configured to be connected to the on-board power supply and the battery via at least one bridge current-rectifier converting AC into DC.

It is necessary to regulate the voltage supplied to the on-board power supply and the battery of the vehicle in such a way that the consumers of the on-board power supply and the battery do not become damaged and work correctly and reliably. For this reason the excitation current of the field winding is controlled.

To this end voltage regulator devices designed to control the excitation current by means of an electronic circuit, comprising one or several electronic component or components, fitted around the alternator, are known. This circuit dissipates heat which must be evacuated. This is not easy to achieve all the more because the circuit is located in an environment where it is subjected to hot temperature, higher than 100° C., which is not very conducive for providing a cooling function.

Thus voltage regulator devices comprising a heat sink, allowing the evacuation of heat generated by the electronic circuit to be facilitated, have already been proposed.

Although efficient up to certain levels of temperature under the bonnet, it was noted however that the known devices were inadequate when the temperature conditions became more severe, for example higher than 120°, with increased power of the electric machines and the need for compactness obliging the voltage regulator device and the alternator to be positioned as near as possible to the thermal engine of the motor vehicle. The efficiency of the heat sink is then crucial because certain electronic circuit components of the voltage regulator device would not function at temperatures above the limit for the technology of the electronic circuit, for example 150° in the case of an electronic circuit in the form of a semiconductor.

OBJECT OF THE INVENTION

The invention proposes a solution to the above problems and relates to a voltage regulator device for a rotary electric machine, in particular alternator and/or alternator-starter of a motor vehicle, comprising one or several electronic component or components, able to contribute to controlling said electric machine, a heat sink having parallel heat-dissipating vanes, said heat sink being in a heat-exchange relationship with said component or components and a support on which said heat sink is positioned.

According to the invention, said support is able to be mounted on the electric machine in such a way that the vanes of the heat sink can orient an air flow towards a region of depression, provided between said support and said machine.

The orientation given to the air flow thus enables its flow rate to be improved by conferring on it a more direct trajectory and allowing it to avoid obstacles, especially obstacles representing hot points such as a bridge current-rectifier. In this way the capacity to evacuate heat is increased by virtue of the quantity of air sweeping the vanes of the heat sink and more effective heat exchange is obtained, allowing the electronic component or components to cool, even in a severe temperature environment, this in regard to a heat sink which remains easy to produce and, without greatly modifying the voltage regulator device, thus more reliable.

In this way a more robust alternator is provided because the regulation device is more responsive to the rise in temperature than the bridge current-rectifier or rectifiers which can function at limit temperatures given by the technology, for example about 225°.

According to other features procuring other advantages and taken separately or in combination:
- the heat sink comprises a base, in a heat-exchange relationship with said electronic component or components, and said vanes extend from said base,
- the base is in direct contact with said electronic component or components via means of fixing, such as adhesive or welding,
- the base is in indirect contact with the electronic component or components via a substrate inserted between the base and said electronic component or components,
- said vanes extend substantially perpendicularly relative to said base, said heat sink having an axis D, parallel with the vanes, oriented towards said region of depression,
- the support moreover comprises a brush holder provided with at least one housing, known as brush holder housing, oriented according to direction D', able to accommodate a brush enabling an electric connection to be established with a rotor of the electric machine,
- axis D of the heat sink and axis D' of the brush holder housing form an angle greater than 10°,
- axis D of the heat sink and axis D' of the brush holder housing form an angle ranging between 40 and 90°, in particular about 66°.

It could be proposed that the heat sink comprises two heat-dissipating vanes extending from the side edges of the base, producing a U-profile, for example obtained by folding. The heat sink therefore comprises, possibly, at least one additional heat-dissipating vane placed midway for example between said two vanes. Said vane or vanes are joined to the base for example by welding. Alternatively, they could be inserted in one groove or grooves provided on the base.

The heat sink and additional vane or vanes are made from thermo-conductive material.

By virtue of this or these additional vanes, heat dissipation is further improved. According to this embodiment of the invention, the following features can be used:
- said vane or vanes extend axially towards the interior beyond the base,
- said vane or vanes have an extension adapted to being placed opposite a central air intake opening of said electric machine,
- said extension can be placed between said support and the central opening of said electric machine,
- said vane or vanes are overall L-shaped,
- the heat sink comprises several additional heat-dissipating vanes, said additional vane or vanes are made from the same material as the heat sink.

Alternatively or complementarily, the support could also comprise a first part, where the heat sink is located, said first part having a side edge equipped with said brush holder or holders. One slot or slots are provided through said support between said first part and said brush holder or holders. These slots allow air to pass and thus cooling is improved, including around the brush holder housings. More precisely the electrical tracks connecting the brush holder to the electronic circuit of the voltage regulator device are cooled even more, which enables the temperature of the electronic circuit to be decreased further. The temperature of the collecting rings of the collector which the rotary electric machine comprises is also reduced.

Again alternatively or complementarily, said heat sink is made from copper and is in direct or indirect contact with the component or components. In this way heat dissipation is again improved.

The additional vane or vanes are made from copper.

The invention also relates to a rotary electric machine bearing equipped with a regulating device as described above and a rotary electric machine equipped with such a bearing.

The bearing moreover could be equipped with a device to rectify the current generated by the electric machine in order to form a current rectifier arrangement comprising a central opening, said region of depression being located around said opening.

The latter, in particular, is situated in the extension of a central opening of the bearing, said central openings being designed to allow the shaft to pass through the machine to which the voltage regulator device pertains.

The invention will be better understood and other advantages will appear in the light of the following description, which is only given as an indication and is not intended to limit it, accompanied by the appended drawings.

BRIEF DESCRIPTION OF THE DRAWINGS

FIG. 6 is a perspective view from above for a protective cover configured to optimize the air flow in the region of the voltage regulator device, FIG. 7 is a perspective view from below of the cover on FIG. 6.

DESCRIPTION OF EXEMPLARY EMBODIMENTS OF THE INVENTION

Figure 1:
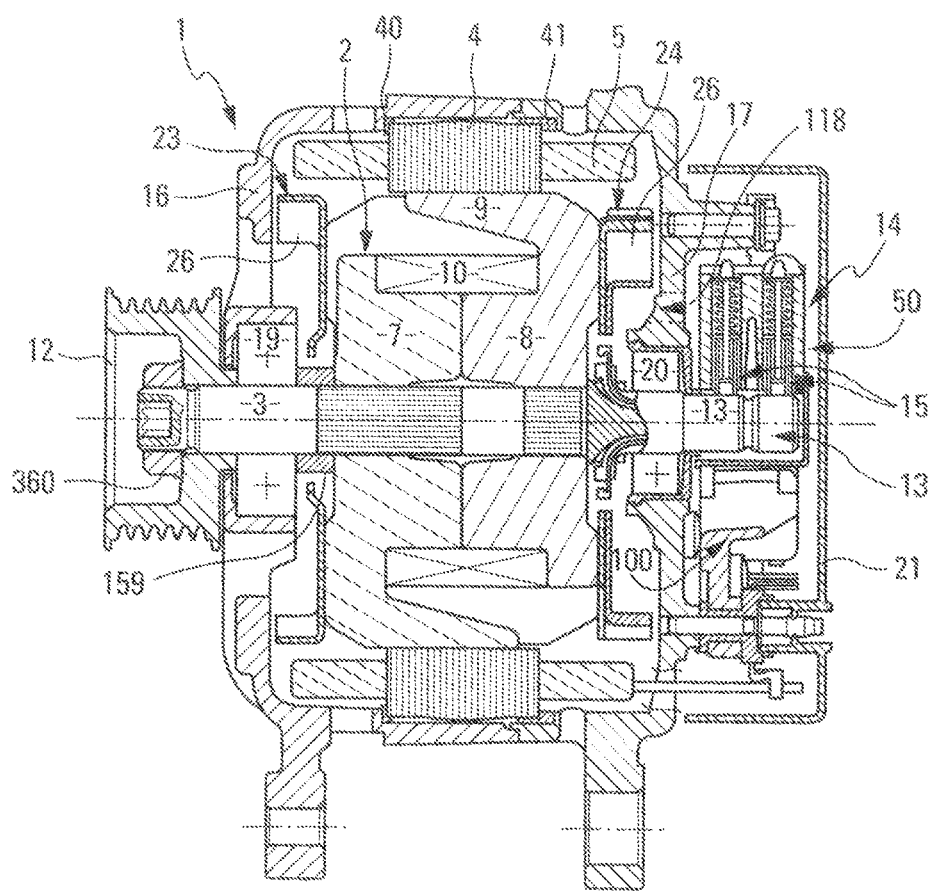
FIG. 1 illustrates, along a radial section plane, an exemplary embodiment of an inventive electric machine.
Figure 2:
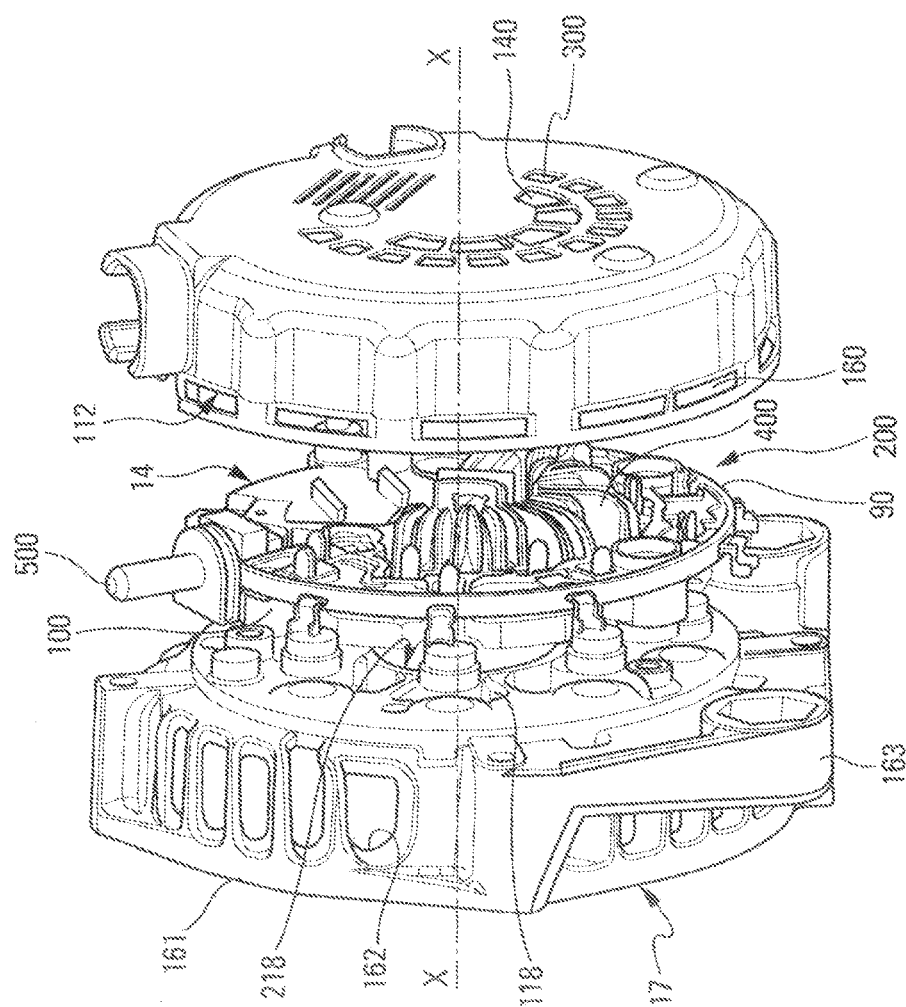
FIG. 2 is a perspective view of an axial end portion of an alternative embodiment of said machine, illustrated in an exploded way.

First of all we will describe an example of a rotary electric machine in which an inventive regulating device can be employed, this in relation to FIGS. 1 and 2.

As illustrated on FIG. 1, said especially polyphase machine, comprises for example a casing 1 and, inside the latter, a shaft 3, a rotor 2 rotating integrally with shaft 3 and a wound stator 4, which encloses rotor 2 with the presence of a weak air-gap, not-evident on the figure.

This stator 4 comprises for example a body in the form of a pack of metal plates equipped with notches provided with notch insulation for mounting the winding of stator 4. The latter comprises several phases, which each consist of at least one roller bearing forming a chignon 5 on either side of the body of the stator. The outputs of the phases are delta- or star connected, for example, and linked to a connector pertaining to a device converting AC into DC, serving to feed the on-board power supply and to recharge the battery of the motor vehicle.

The rotor, inductive via at least one inductive winding 10 associated with the rotor, generates an alternating current in the winding of stator 4 when shaft 3 rotates. This current is converted into DC by means of the device converting AC into DC.

The rotor here is a claw rotor, as described for example in documents US 2002/0175589 A1 and EP 0 454 039 A1, comprising two axially juxtaposed polar wheels 7, 8 each having a transverse flange provided on its external periphery with teeth 9 of trapezoidal shape axially oriented towards the flange of the other polar wheel, the tooth of one polar wheel penetrating the space existing between two adjacent teeth 9 of the other polar wheel. A field winding 10 is installed axially between the flanges of wheels 7, 8. This winding 10 is supported by a cylindrical hub in two parts each pertaining to one of the flanges of wheels 7, 8. Alternatively the hub is a solid casting distinct from the flanges of wheels 7, 8. Shaft 3 could have knurled portions for fixing polar wheels 7, 8.

When the field winding 10 is fed electrically, rotor 2, made from ferromagnetic material, is magnetized and becomes an inductive rotor while forming north-south magnetic poles around axially oriented teeth 9 of polar wheels 7, 8.

Alternatively the rotor can be of the salient pole type, as described for example in document WO 02/054566, and comprise several field windings each coiled around such a pole and mounted in series as evident in FIGS. 1 and 2 of this document.

Alternatively the rotor comprises two claw polar wheels and two field windings as described in document FR 2 857 517.

Again alternatively the rotor is also provided with permanent magnets.

Shaft 3 of rotor 2, in the embodiment of FIG. 1, on its front end supports a pulley 12 pertaining to a device to transmit movement between the alternator and the thermal engine of the motor vehicle. Said transmission device comprises at least one belt, not illustrated, for example driven by a crankshaft of the thermal engine.

In the example illustrated, shaft 3 of the engine on its rear end supports collecting rings 13 hard-wire connected to the terminals of field winding or windings 10 of rotor 2 of the type such as described in document FR 2 710 200, for example via a collector. Brushes 15 are disposed in such a way as to rub on collecting rings 13. These brushes are accommodated in a brush holder 50 pertaining, in the case of the exemplary embodiment illustrated, to the inventive voltage regulator device 14 which will be described further down. In practice the collecting ring nearest to the rear end of shaft 3 is connected to earth.

A casing 1, for example, includes two parts, namely a front flange 16, known as front bearing, adjacent to pulley 12, and a rear flange 17, known as rear bearing, in this embodiment supporting the voltage regulator device 14 disposed outside the casing 1, and the current rectifying device converting AC into DC also disposed outside the casing 1 as best shown in FIGS.1 and 2.

Bearings 16, 17 are metal, here made from aluminium. They are of hollow form in this embodiment. Alternatively at least one of the bearings has a flat form. These bearings 16, 17 each could comprise, centrally, a ball bearing 19 and 20 respectively for rotary mounting of shaft 3. In the embodiment of FIG. 1 a spacer 159 is inserted between the internal ring of bearing 19 and polar wheel 7, pulley 12 resting against the internal ring of bearing 19 while being fixed on the front end of shaft 3 via a nut 360. These bearings 16, 17 are cut out to allow the alternator to cool by circulation of air generated by the rotation of at least one fan. These bearings 16, 17 each have a central opening for the axial end concerned of shaft 3 to pass through.

This fan, in one embodiment not illustrated, is external, being adjacent to pulley 12. In FIG. 1 the fan is internal, being situated in the casing. For this purpose rotor 2 supports, at least on one of its axial ends, a fan designed to ensure this air circulation. In the example illustrated, a fan referenced 23 is provided on the front face of the rotor and another fan 24, more powerful, on the rear face, each fan being provided with a plurality of vanes 26.

Alternatively in order to generate the air flow serving to cool the engine, a turbine or centrifugal pump could be used such as that described in document FR 2 744 575.

Again alternatively the bearing equipped with the voltage regulator device could be cooled by air while the other bearing is cooled by water.

In the case of the bearing equipped with fans, bearings 16, 17 comprise a bottom of overall transverse orientation in relation to the axis of shaft 3 constituting the rotational axis and axial symmetry of the machine. The bottoms are provided with a plurality of air intakes and each are extended on their external periphery by a skirt of overall axial orientation in relation to the axis of shaft 3. The skirt is equipped with a plurality of air output openings. In other words, by virtue of the fans, air circulation is generated between the air input and output openings, the air flow penetrating the alternator in an axial way and leaving there in a radial way, which enables especially chignons 5 of the winding of stator 4 to be cooled.

The air intake openings of the rear bearing for example are of overall trapezoidal shape. A cut out protection cover 21 which caps the current rectifying device and voltage regulator device 14 could also be provided.

It will be noted (FIG. 1) that the body of the stator is mounted in the skirts of bearings 16, 17 via an elastic seal 40 resting against a shoulder of the skirt of bearing 16 and via elastic buffers 41 mounted in the skirt of bearing 17 stepped for this purpose. Alternatively the body of stator 4 is forcibly fitted into the skirts of bearings 16, 17.

According to the embodiments illustrated, one of the bearings, here the rear bearing, could support the current rectifying device and/or voltage regulator device 14, partially evident on FIG. 1, in order to form a unit known as current rectifying arrangement. Alternatively it is the front bearing which supports the current rectifying device and/or the voltage regulator device as evident on FIG. 1 of document FR 2 744 575.

Such an arrangement makes it possible to make available an electric machine and a current rectifying device and/or a voltage regulating device forming a mechanical unit able to be fitted into the vehicle. Moreover it enables the rectifier device and/or the voltage regulator device to be cooled by the air flow generated by said fan or fans.

Said current rectifying device here comprises for example a 3-phase, 6-phase or 5-phase bridge current-rectifier. Alternatively, several bridge current-rectifiers could be provided.

The bridge comprises for example a first heat sink, known as negative heat sink, supporting first current rectification elements, such as diodes or transistors of the MOSFET type, a second heat sink, known as positive heat sink, supporting second current rectification elements, such as diodes or transistors of the MOSFET type, and a connector comprising a body made from electrically insulating material in which electrically conducting branches are embedded. These branches can be seen individually and each connects a first current rectification element of one of the heat sinks to a second current rectification element of the other heat sink, said first and second current rectification elements being at different potentials. Each of the phase outputs of the alternator or the alternator-starter is electrically connected to a branch of the connector at a central point provided between the first and second current rectification elements connected to said branch.

In an embodiment illustrated for example in document FR 2 754 650, the branches of the connector comprise pads for connection to an output of each of the phases and two of the branches are extended and provided on their free end with a half ring for connection to voltage regulator device 14. In other words, as detailed further down, the inventive voltage regulator device in one embodiment is connected to conductive branches linked to two of the phases of the engine. Alternatively, as evident on FIG. 1 of this document FR 2 754 650, two of the branches are extended and provided on their free end with a ring for connection to voltage regulator device 14.

The negative heat sink is constituted for example by one of bearings 16, 17 made from aluminium of casing 1 of the alternator connected to the earth of the motor vehicle, while the positive heat sink for example made from aluminium is supported, being electrically insulated by this bearing, and is provided with a terminal, known as terminal B+, designed to be connected to the positive terminal of the battery of the vehicle via a cable.

Figure 3:
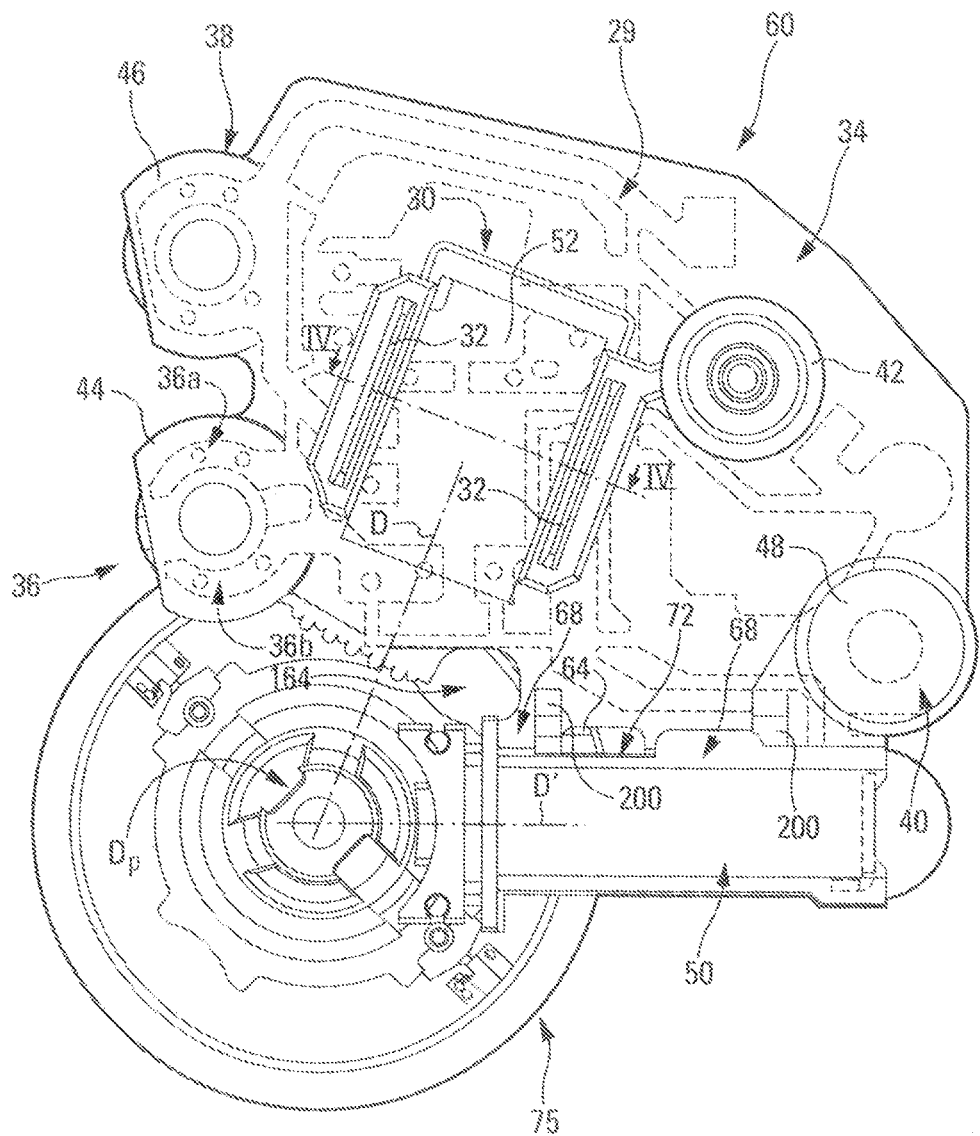
FIG. 3 is a view from above of an exemplary embodiment of an inventive regulating device.

The current rectifier diodes, for example, are forcibly fitted in the negative heat sink and the positive heat sink respectively, as evident for example in FIG. 14 of document WO 02/054566 or in FIG. 3 of document WO 02/093717. The bridge of FIG. 1 here is of the same type as in FIG. 3 of document WO 02/093717.

In this embodiment, as described in document FR 2 807 583 to which reference should be made, the positive heat sink could also comprise, at its circumferential end close to terminal B+, an extension in the form of a lug perforated for electrical contact with the voltage regulator device and for electric connection with the positive terminal of the battery via terminal B+ of this positive heat sink.

Of course the number of current rectification elements depends on the applications and especially on the number of phases and bridge current-rectifiers on the machine. Thus three negative diodes and three positive diodes are provided in the embodiment of document WO 02/093717 relating to an alternator of the 3-phase type comprising a bridge current-rectifier. In document U.S. Pat. No. 7,019,424 six negative diodes and six positive diodes and two bridge current-rectifiers are provided, the alternator being of the 3-phase double type.

Figure 8:
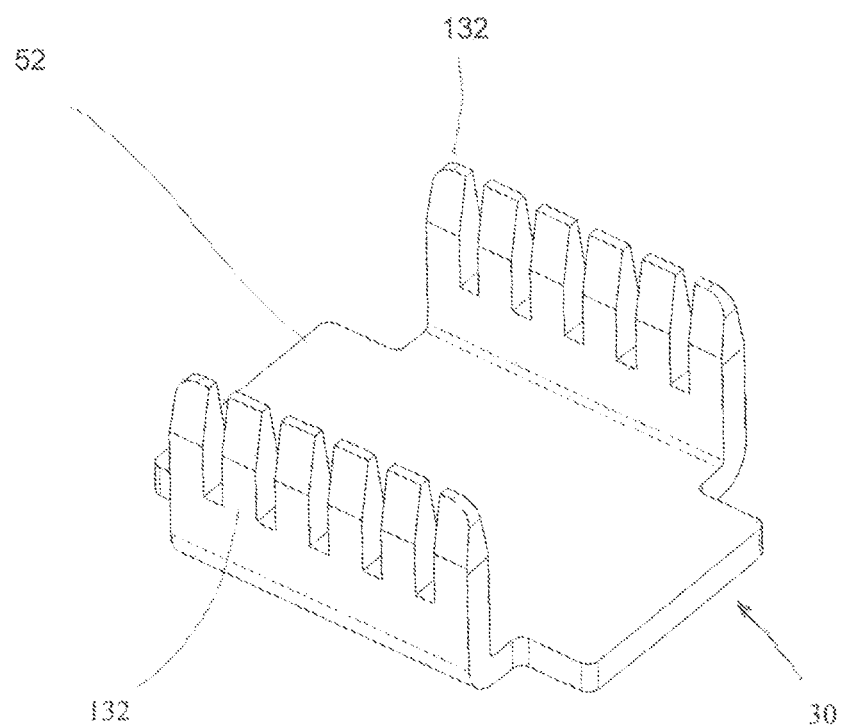
FIG. 8 is a perspective view of an alternative heat sink with heat-dissipating vane in the shape of a comb.

FIG. 2, which is a perspective view similar to FIG. 8 of document U.S. Pat. No. 7,019,424, shows this kind of embodiment.

Thus, according to this embodiment of the invention, a protection cover 112, here made from plastic, provided with air passage openings 140, 300 and 160 could be used.

The current rectifying device comprises a bridge current-rectifier 200 converting AC into DC comprising a positive heat sink 100, in particular equipped with vanes 400 and/or a terminal 500 constituting terminal B+, a connector 90 provided with pads (not referenced), for example projecting in the form of fixing grips by crimping the phase outputs of the winding of the stator, and a negative heat sink constituted by the rear bearing 17. This bearing for example comprises a transverse bottom in relation to the axial axis of symmetry X-X combined with the axis of shaft 3 of FIG. 1. This bottom is provided on its external periphery with openings for mounting the diodes. Its internal periphery in particular has a plurality of air intake openings, one of which is evident at 118. These openings 118, here of overall trapezoidal shape, are laterally delimited by arms separating two consecutive openings 118 and/or internally by a central ring delimiting a central opening 218 for passage of the collector equipped with collecting rings 13 and the rear end of the shaft of the rotor. Axis X-X passes through the centre of opening 218. This bottom is extended on its external periphery by a skirt 161 of axial orientation in relation to axis X-X equipped with air output openings 162 of oblong shape. A fixing lug 163 is also provided on a fixed part of the vehicle. The example of the inventive voltage regulator device 14 illustrated in this figure is inserted between the circumferential ends of the positive heat sink 100 which is perforated for mounting the positive diodes.

Voltage regulator device 14 pertains to the current rectifying arrangement comprising rear bearing 17 and the current rectifying device.

A detailed description of the inventive voltage regulation device 14 is now given.

Figure 4:
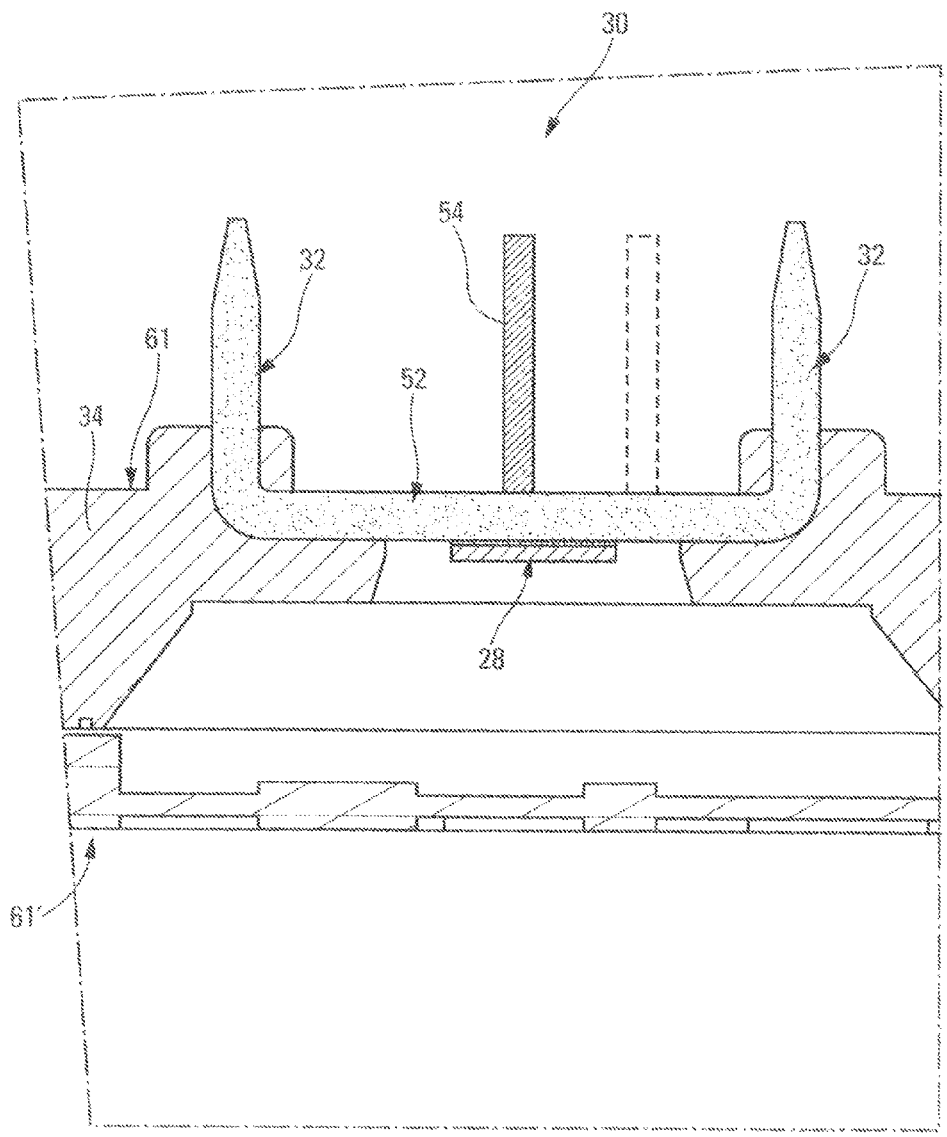
FIG. 4 is a sectional view seen along axis IV-IV illustrated on FIG. 3.
Figure 5:
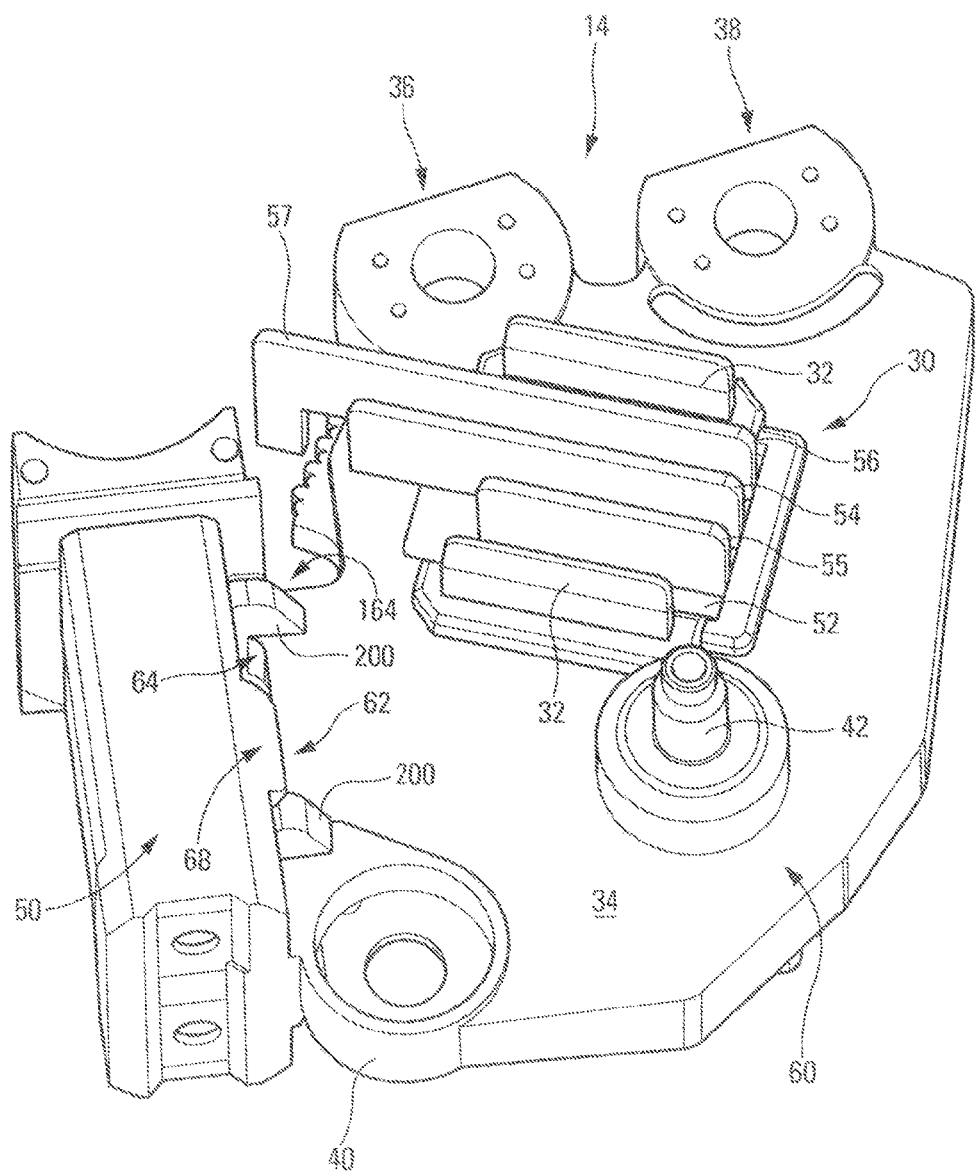
FIG. 5 is a perspective view illustrating an alternative embodiment of the inventive regulating device.

As illustrated on FIGS. 3 to 5, it comprises one or several said electronic component or components 28 in the electronic control circuit, able to contribute to controlling said electric machine, a heat sink 30, having parallel heat-dissipating vanes 32, and a support 34 on which said heat sink 32 is positioned. Said heat sink is in a heat-exchange relationship with electronic control circuit 28 in order to ensure its cooling, in particular, via the air flow crossing rear bearing 17. Electronic control circuit 28 is made up, for example, of a semiconductor or electronic chip circuit, in particular of the ASIC type. It ensures the voltage supplied to the on-board power supply by the rotary electric machine is regulated. For this purpose, it controls for example the current supplied to the field winding of the rotor, in particular, according to various data input such as, inter alia, the voltage available at the terminals of the battery, the rotational speed of the thermal engine and/or the temperature of the thermal engine.

Electronic control circuit 28 in this embodiment could also receive information about two of the phases of the winding of the stator in such a way that the regulator works under good conditions by suppressing parasitic voltages as indicated for example in document FR 2 649 797. It could still allow the machine to function in alternator-starter mode as described in document FR 2 745 444, which as generally known is a reversible alternator also enabling electrical energy to be converted into mechanical energy, especially to start the thermal engine.

Said circuit 28 is connected to various terminals of regulating device 14 via electrical tracks 29 embedded in support 34, illustrated by dotted lines on FIG. 3.

It concerns, for example, a terminal 36 in two half-rings 36a, 36b, designed to be connected to the corresponding terminal of the rectifier device, linked to two of the phases of the engine as described in document FR 2 754 650 mentioned above. According to this embodiment, support 34 of regulator 14 could have projections and complementary recesses (not illustrated) to insulate the half-rings and to create a passage for a fastening screw.

Again it concerns a terminal 38, designed to be electrically connected in a way mentioned above to positive heat sink 100 in the vicinity of terminal B+ of the latter, and/or a terminal 40, designed to be fixed on a bearing enclosure 17 (evident on FIG. 1) for electrical connection with earth via this enclosure.

The regulator could again comprise a connector 42 linked by one or several of electrical tracks 29 to electronic control circuit 28 for, in particular, acquiring information about the rotational speed and temperature of the thermal engine of the motor vehicle via hard-wire connections linking connector 42 to an electronic control unit of the thermal engine of the vehicle. Said connector 42 can be directly linked to an electrical conductor which is external to the device. Alternatively it is linked to the cover for this purpose comprising at least one electrical track embedded in the body of the cover made from electrically insulating material and linked to a connector carried by the cover. In this case as evident in FIGS. 3 and 5 connector 42 consists of a terminal. Of course alternatively two terminals are provided. All depends on the applications and amount of information received by device 14.

The inventive regulating device for example comprises three fixing lugs 44, 46, 48 perforated centrally for fixing the regulator to the bearing using screws. Said terminals 36 connected to two of the phases of the engine, 38 to terminal B+ and 40 to earth, for example, are provided respectively around said lugs 44, 46, 48. Alternatively, in a way mentioned above, two lugs are provided for each of the connections to a phase instead of only one lug 44. These lugs could always be positioned in a standard way, one in relation to the other, from one generation of regulating devices to the other, so they can be fixed on the same support.

In the example illustrated where the regulating device is equipped with a brush holder 50, lug 48 designed to be fixed on bearing 17 is closest to the brush holder, while the two other lugs 44, 46 are close to one another and/or adjacent to electronic control circuit 28, lug 44 corresponding to terminal 36 connected to two of the phases of the electric machine, being closer to brush holder 50 than lug 46 corresponding to the terminal connected to terminal B+.

Said control circuit 28 for example is positioned between connector 42 and two lugs 44, 46 close to one another, just as heat sink 30. The latter, in particular, is situated above control circuit 28.

It is clear from what has been stated above that the inventive regulating device 14 can be advantageously used instead of that of FIG. 8 in document U.S. Pat. No. 7,019,424 mentioned above, without modifying the electrical connections of device 14 with the positive heat sink 100, the two phase outputs of the connector and the two phases of connector 90.

Said support 34 is made from insulating material such as PPS for example. Heat sink 30, in particular, is over-moulded in support 34.

According to the invention, said support 34 can be mounted on the electric machine in such a way that vanes 32 of heat sink 30 can orient an air flow towards a region of depression Dp provided between said support and said machine. In this way heat dissipation is improved.

The region of depression is defined for example by positive heat sink 100 and support 34 of regulator 14, which circumferentially extends said positive heat sink 100 by defining a central opening, known as air intake, not evident on the figures, located in the axial extension of central opening 218 of bearing 17. Said region of depression, in particular, is around said air intake opening.

In particular, said vanes 32 are directed to radially orient the air flow, that is to say, towards axis X-X of rotor 3 of the electric machine and towards the central air intake opening. This air flow is then axially oriented towards opening 218. It may be noted that on FIG. 3, a collector 75 of the type described in document FR 2 710 200 is evident. This collector 75 mounted on the rear end of shaft 3 and crosses the central opening 218 of the bearing 17 where, in a known way, a ring (not referenced on FIG. 1) radially inserted between the edge of opening 218 and the external periphery of the external ring of roller bearing 20 is mounted. This ring comprises a bottom (not referenced on FIG. 1) crossed by the collector. This bottom is cut out and for this purpose comprises a plurality of circumferential openings of oblong shape. The ring enables the phenomena of dilatation occurring between bearing 17 and roller bearing 20 to be absorbed.

Heat sink 30 for example comprises a base 52, in a heat-exchange relationship with electronic control circuit 28. Said vanes 32 then extend from said base 52. Said control circuit 28, in particular, is centred on said base. The surface ratio of said circuit 28 to that of said base 52 is, for example, between 30 and 60%.

Said vanes 32 could extend substantially perpendicularly in relation to said base 52. Said heat sink 30 has an axis D, parallel with vanes 32, oriented towards said region of depression. In other words axis D, for example, is radially oriented in relation to the axis of the rotor.

The inventive regulating device does not necessarily comprise a brush holder as described in document FR 2 744 575 mentioned above, the field winding associated with the rotor then being fixed. However, as already stated, it might be provided, as in the embodiment illustrated.

In other words, support 34 could comprise a brush holder 50 provided with at least one housing, said brush holder housing, oriented according to a direction D', possibly accommodating a brush enabling an electric connection to be established with the rotor of the electric machine. In fact, two housings are provided, located one above the other as evident on FIG. 5 and having the same orientation D', one accommodating a brush designed to be connected to a source supplying the excitation current of the rotor, as determined by electronic control circuit 28, and the other accommodating a brush designed to be connected to earth as evident on FIG. 1.

Said support 34 is configured so that it can be fixed allowing brush holder housing or housings 50 to be oriented in the direction of the axis of the rotor and central air intake opening, that is to say, in the direction of said region of depression in correspondence with central opening 218 of bearing 17.

Said brush holder 50 for example is of overall parallelepiped shape. The housings in particular are of overall rectangular section for fitting into each of those of a brush. The brushes could be radially biased by a spring in the direction of the collecting ring 3 concerned. Each brush is connected, for example using electrically conducting braid, to an electrical terminal itself electrically connected to one of electrical tracks 29 embedded in support 34. These tracks are electrically connected to electronic control circuit 28 of regulator 14.

Axis D of heat sink 30 and axis D' of the brush holder housings form, for example, an angle greater than 10° such as an angle ranging between 40 and 90°, in particular an angle of approximately 66°.

Excellent results were obtained with an angle of 66°.

According to the exemplary embodiment illustrated on FIGS. 3 and 4, the heat sink for example comprises two said heat-dissipating vanes 32 extending from side edges of base 52, in such a way as to produce a U-profile. The free edge of said vanes could be beveled.

According to an alternative embodiment, illustrated on FIGS. 4 and 5, heat sink 30 comprises at least one additional heat-dissipating vane 54, 55, 56 placed between said two heat-dissipating vanes 32. Said additional vane 54 for example is located midway, that is to say just above circuit 28 for even better evacuation of heat and better cooling of the electronic component or components of the electronic circuit. In other words, the heat sink has an E-profile as evident on FIG. 4.

At least one other additional heat dissipating vane could be provided. On FIG. 4, such an additional vane is illustrated by dotted lines. On FIG. 5, two other additional heat-dissipating vanes 55, 56 are provided, for example halfway between the first 54 and heat-dissipating vanes 32 extending from the side edges of base 52 of heat sink 30.

Said midway vane 54 could be axially extended in axis D beyond base 52 of heat sink 30 and this in the direction of the central air intake opening for better evacuation of heat. Alternatively this midway vane is again axially extended in axis D towards the interior to extend beyond support 34 and to be placed opposite this central air intake opening. Another 56 of the vanes could have an extension 57 axially oriented towards the interior parallel to axis D in such a way that this extension is adapted to being placed opposite the central air intake opening. In one embodiment the extension has an internal end perpendicular to support 34 as evident on FIG. 5. This extension is oriented towards the central air intake opening. In other words, said vane 56 has an L-profile. Said vanes 54, 55, 56 therefore have an increasing length.

Of course all depends on the applications, midway vane 54 in an alternative version having an L-shape identical to that of vane 56. All combinations of shape and number of vanes are possible.

Said heat sink 30 in a metal embodiment for example is made from copper. In other words, the components of the heat sink, base 52 and/or heat-dissipating vanes 32, 54 are made from copper. It could concern a minute amount of copper having a coefficient of conductivity between 350 and 400 W/m.K and/or a thermal dilatation coefficient between 15 and 20.

Base 52 of the heat sink and heat-dissipating vanes 32 which emerge from this could be obtained by folding.

Heat sink 30, in particular its base 52, is in contact with electronic control circuit 28, for example by silver adhesive. Alternatively contact is indirectly made via a substrate.

Additional heat-dissipating vane or vanes 54 could be joined to base 52 of the heat sink, for example by laser welding. It or they have, in particular, a thickness which is less than that of dilatation vanes 32 emerging from base 52.

Alternatively the vanes are joined to the base, each being inserted in a groove provided in base 52. In this case the vanes are made from thermo-conductive material just as the heat sink. They are made from a material identical to that of heat sink 30 or alternatively from a different material, the heat sink being for example copper and the vanes aluminium or any other material allowing the transfer of heat to be adjusted. Of course one of the vanes can be made from copper and the other vanes made from a different material, aluminium for example. The grooves could be delimited by a pair of ribs. They enable a standard heat sink, to which a greater or lesser number of vanes according to need is attached, to be provided.

If reference is again made to the embodiment of FIGS. 3 and 4, the support for example comprises a first part 60, where heat sink 30 is located and said first part 60 having a side edge 62 equipped with brush holder 50. One slot or slots 64 can then be provided through support 34 between said first part 60 and said brush holder housing or housings 50. Support 34 in this embodiment covers at least one air intake opening 118 of bearing 17. Slot 64 is advantageously provided opposite an air intake opening 118. A clearance 164 is also provided around the internal end of the brush holder. This clearance open towards the interior affects the side edge of device 14 extending between lug 44 and the internal periphery of brush holder 50. In this way the passage of air and cooling of brush holder 50 and brushes are increased.

The material bridges 68 remaining between first part 60 and the brush holder enable the mechanical connection between these two regions of regulating device 14 and the passage of electrical tracks 29 to be ensured. On this subject reinforcement ribs 200 could be provided between first part 60 of support 34 and brush holder 50. Here they are two in number. They are located on both sides of slot 64.

On FIG. 2 only the heat-dissipating vanes 12 and brush holder 50 of voltage regulator device 14 are illustrated in detail, other components—especially the electrical terminals—having been omitted for simplification.

According to one approach, said regulating device 14 comprises two parts: an electronic part with electronic control circuit 28 and electrical tracks 29 and one mecatronic part with support 34, its brush holder cages, fitted, as well as heat sink 30.

As clear from what has been stated above and the drawings, the extensions of vanes 54, 56 are oriented towards a central opening of the machine, constituted by the central air intake opening. These extensions are adapted to being placed at least between support 34 and said central opening, extension 57 penetrating this central opening.

Support 34 at least partially covers an air intake opening 118, while in this embodiment the vanes of positive heat sink 100 allow air flow to axially pass through said openings as illustrated in FIGS. 1 and 5 of document U.S. Pat. No. 7,019,424 mentioned above. The passage through these openings 118 depends on the applications and the form of the bridge current-rectifier or rectifiers.

The central air intake opening constitutes a region of depression provided between support 34 and the rotary electric machine.

By virtue of the orientation of the heat sink the temperature of electronic circuit 28 is decreased in such a way that the latter remains below its limit temperature. Thus the rotary electric machine is rendered more robust and more reliable, considering that the voltage regulator device is more responsive to rise in temperature than the bridge current-rectifier or rectifiers.

By virtue of the invention the temperature of the brush housing or housings can be decreased in such a way that the slip motion of the brushes is facilitated.

Of course the temperature of voltage regulator device 14 can be further decreased by optimizing the air flow which sweeps heat sink 30 and thus the heat dissipation capacity can be increased in particular by convection.

With this intention the cover of FIG. 2 is modified according to at least one of the following features:
  the positioning of the openings of the cover is changed in relation to heat sink 30,
  the size of the openings of the cover is changed in relation to the heat sink,
  the bottom is brought closer to the cover in relation to the heat sink,
  curbs are created in the cover around the heat sink.

Thus as evident in the embodiment of FIGS. 6 and 7 cover 112, of hollow form, comprises just as that of FIG. 2 a bottom 212 extended on its external periphery by a skirt 312 in order to cap the bridge current-rectifier and voltage regulator device 14.

The openings of bottom 212 of the cover which are opposite heat sink 30 are modified. These openings comprise four openings 311, of overall square shape, which are opposite base 52 of the heat sink and any possible additional vanes 54, 55, 56 of FIGS. 4 and 5. Openings 311 are provided between vanes 32 of heat sink 30 illustrated by dotted lines on FIG. 6. There is also an opening 310 designed to come opposite the external periphery of heat sink 30 on the outside of vanes 32 and any possible additional vanes. Thus with this intention opening 310 is of oblong shape and overall length equal to twice the width of an opening 311 increased by the thickness of the material band existing between two openings 311.

It is clear from what has been stated above that the positioning of openings 310, 311 is different in relation to the openings (not referenced) of FIG. 2. The positioning of openings 310, 311 is a function of the positioning and orientation of the inventive heat-dissipating vanes 30.

As evident in FIGS. 6 and 7 the size of openings 310, 311 is different in relation to that overall identical to the openings (not referenced) of the cover in FIG. 2, the size of openings 311 being larger.

According to another feature openings 310, 311 are brought closer in relation to heat sink 30.

With this intention openings 310, 311 are provided in a depression 315, which bottom 212 of cover 112 locally comprises for this purpose. This depression 315 is brought closer to vanes 32 of heat sink 30.

According to another feature curbs 313, 314 are created positioned around heat sink 30. These curbs 313, 314 for ducting the air flow are overall U-shaped with a bottom 313 overall parallel with opening 310 and two branches 314 parallel with openings 310 as evident on FIG. 7, in such a way that a weak space exists between vanes 32 and their branches 314. A weak space also exists between bottom 313 and opening 310. These curbs 313, 314 enable the air to be guided, the surfaces of openings 310, 311 being maximized and opposite heat sink 30 in order to optimize the natural convection. Moreover the distance between vanes 32 and bottom 212 of the cover is reduced. Of course the size of the curbs is a function of that of vanes 32 of the heat sink, curbs 313, 314 being slightly higher than vanes 32.

Heat sink 30 is thus at least partially housed in a cavity of cover 112. This cavity is open towards the interior and is delimited by curbs 133, 134 and by a perforated bottom pertaining to a depression 315 of bottom 212 of the cover. U-shaped curbs 313, 314 emerge from depression 315, being oriented towards the interior of the cover.

All these feature allow the temperature of electronic component or components 28 to be reduced even more. Dissipation of the heat from electronic component or components 28 is significantly improved, in such a way that hot applications (ambient temperatures of 125°) can be increasingly tolerated.

Of course support 34 in all the cases can be made from high performance polymer PPS for example, in order to ensure good electric insulation especially of component or components 28, and to obtain good resistance.

It will be noted in FIGS. 6 and 7 that the lid comprises three barrels (not referenced) for screwing the cover to the rear bearing. It is clear from FIGS. 6 and 7 that depression 315 does not affect the brush holder. It should be noted that the opening (not referenced) of skirt 312 of the cover is dedicated to the output of terminal B+ (500).

In order to increase heat dissipation further vanes 32 can be split to optimize the passage of air flow between curbs 313, 314 and vanes 32 even more.

Thus in one embodiment vanes 132 (FIG. 8) are in the shape of a comb. This arrangement enables turbulences in air flow to be created and the heat-conducting surfaces to be increased, of course it being possible for the heat sink to be equipped with additional vanes 54 to 56, which alternatively could be split for example in the shape of a comb.

Alternatively this type of heat sink can be associated with the cover on FIG. 2.

Of course the thickness of vanes 32, 132 alternatively is less than the thickness of base 52 of heat sink 30.

It will be noted that in FIG. 8 the thickness of vane 132 is reduced on its external periphery. It is the same with vanes 32 of FIGS. 4 and 5. This is applicable for vanes 54 to 56.

Vanes 32, 132 could therefore be tapered on their external periphery.

Of course the cover may be made from metal or plastic. Openings 311 alternatively have another shape. Thus alternatively openings 311 are of rectangular or polygonal shape.

The invention claimed is:

1. A voltage regulator device for a rotary electric machine in the form of an alternator and/or alternator-starter of a motor vehicle, the voltage regulating device (14) comprising:
    at least one electronic component (28) for controlling the rotary electric machine;
    a heat sink (30) having parallel heat-dissipating vanes (32, 132), the heat sink being in a heat-exchange relationship with the at least one electronic component; and
    a support (34) on which the heat sink is positioned, the support is configured to be mounted on the rotary electric machine in such a way that the heat-dissipating vanes of the heat sink orient an air flow towards a region of depression provided between the support (34) and the rotary electric machine.

2. The device according to claim 1, wherein the heat sink comprises a base (52) in a heat-exchange relationship with the at least one electronic component, the heat-dissipating vanes extend from the base.

3. The device according to claim 2, wherein the heat-dissipating vanes extend substantially perpendicularly in relation to the base, and wherein the heat sink has an axis D, parallel with the heat-dissipating vanes, oriented towards the region of depression.

4. The device according to claim 3, wherein the support comprises a brush holder provided with a brush holder housing (50), wherein the brush holder housing is oriented according to an axis D', and wherein the a brush holder housing (50) is configured to accommodate a brush allowing an electric connection to be established with a rotor (3) of the rotary electric machine.

5. The device according to claim 4, wherein the axis D of the heat sink and the axis D' of the brush holder housing form an angle greater than 10°.

6. The device according to claim 4, wherein the axis D of the heat sink and the axis D' of the brush holder housing form an angle ranging between 40 and 90°.

7. The device according to claim 4, wherein the heat sink comprises two heat-dissipating vanes extending from side edges of the base in such a way as to produce a U-profile.

8. The device according to claim 7, wherein the heat sink comprises at least one additional heat dissipating vane (54, 55, 56) placed between the two heat-dissipating vanes.

9. The device according to claim 8, wherein the vanes (55, 56) is axially extended towards the interior beyond the base.

10. The device according to claim 8, wherein the vanes have an extension adapted to being placed opposite a central air intake opening of the electric machine.

11. The device according to claim 10, wherein the extension is able to be placed between the support and the central opening of the electric machine.

12. The device according to claim 11, wherein the vanes (56) are generally L-shaped.

13. The device according to claim 4, wherein the support comprises a first part (60), where the heat sink is located, the first part having a side edge (62) equipped with the brush holder, and wherein at least one slot (64) is provided through the support (34) between the first part and the brush holder.

14. The device according to claim 13, wherein the heat sink made from copper is in direct contact with the at least one electronic component.

15. The device according to claim 14, wherein the heat sink is in contact with the at least one electronic component.

16. A bearing of rotary electric machine equipped with a regulating device according to claim 1.

17. The bearing according to claim 16, further comprising a device to rectify the current generated by the electric machine in order to form a current rectifying arrangement (200-14), wherein the bearing comprises a central opening, and wherein the region of depression is located around the opening.

18. A voltage regulator device for a rotary electric machine in the form of an alternator and/or alternator-starter of a motor vehicle, the voltage regulating device (14) comprising:
    at least one electronic component (28) for controlling the rotary electric machine;

a heat sink (30) having parallel heat-dissipating vanes (32, 132), the heat sink being in a heat-exchange relationship with the at least one electronic component; and a support (34) on which the heat sink is positioned, the support is configured to be mounted on the rotary electric machine in such a way that the heat-dissipating vanes of the heat sink orient an air flow towards a region of depression provided between the support (34) and the rotary electric machine;

the heat sink (30) comprising a base (52) in a heat-exchange relationship with the at least one electronic component, the heat-dissipating vanes extending from the base;

the heat-dissipating vanes (32) extending substantially perpendicularly in relation to the base, and wherein the heat sink having an axis D parallel with the heat-dissipating vanes oriented towards the region of depression;

the support (34) comprising a brush holder provided with a brush holder housing (50), the brush holder housing oriented according to an axis D', the a brush holder housing (50) configured to accommodate a brush allowing an electric connection to be established with a rotor (3) of the rotary electric machine;

the support (340 further comprising a first part (60), where the heat sink is located, the first part having a side edge (62) equipped with the brush holder;

at least one slot (64) provided through the support (34) between the first part and the brush holder;

the heat sink being in direct contact with the at least one electronic component via a substrate.

19. The device according to claim 18, characterized wherein the heat-dissipating vanes (132) are in the shape of a comb.

20. The device according to claim 19, wherein the heat-dissipating vanes (32, 132) are tapered on their external periphery.

21. A rotary electric machine comprising a bearing equipped with a voltage regulator device (14) comprising:
   at least one electronic component (28) for controlling the rotary electric machine;
   a heat sink (30) having parallel heat-dissipating vanes (32, 132), the heat sink being in a heat-exchange relationship with the at least one electronic component; and
   a support (34) on which the heat sink is positioned, the support is configured to be mounted on the rotary electric machine in such a way that the heat-dissipating vanes of the heat sink orient an air flow towards a region of depression provided between the support (34) and the rotary electric machine.

22. The rotary electric machine according to claim 21, further comprising a cover (112) capping the voltage regulator device (14), wherein the cover (112) comprises openings (311, 310) opposite the heat sink (30).

23. The rotary electric machine according to claim 22, wherein the heat sink (30) is at least partially housed in a cavity of the cover (112) open towards the interior and delimited by curbs (133, 134).

24. The rotary electric machine according to claim 23, wherein the cavity is delimited by a perforated bottom pertaining to a depression (315) of the bottom (212) of the cover (112), and wherein curbs emerge from the depression and are U-shaped.

* * * * *